3,055,738
PRODUCTION OF NITRILES

Lawrence J. Krebaum, Texas City, Tex., assignor to Monsanto Chemical Company, St. Louis, Mo., a corporation of Delaware
No Drawing. Filed Oct. 24, 1960, Ser. No. 64,301
6 Claims. (Cl. 23—151)

The present invention relates to a new method of preparing certain organic nitriles from acetonitrile and hydrogen cyanide (HCN).

According to the invention, acetonitrile and HCN are reacted at a temperature in the range from about 700° C. to about 1100° C. to produce a reaction mixture containing at least one of the compounds chosen from the group consisting of malononitrile, acrylonitrile, fumaronitrile, propargyl nitrile and cyanogen. In the preferred embodiment of the process, a gaseous mixture of acetonitrile and HCN together with a diluent gas if one is desired is continuously passed through a reaction zone heated to reaction temperature at a rate such that the mixture remains therein for the desired reaction period. The gases issuing from the reaction zone are quenched as rapidly as possible and the different nitriles are recovered by conventional condensation and fractional distillation techniques.

The invention is illustrated in the following example which, however, is not to be construed as limiting it in any manner whatsoever.

EXAMPLE I

The experimental apparatus was comprised of a reactor consisting of empty "Vycor" (96% silica) tube having an effective length of 20 cm. disposed within a muffle furnace together with inlet and outlet manifolds, vaporizers for the HCN and acetonitrile with the required accessory lines, a mixing chamber for the reactant gases, ad a product gas receiver. Prior to the run, the system was warmed up while argon was passed through it. Acetonitrile and HCN vapors were fed through rotameters into the mixing chamber and then passed through the reactor which had been heated to the desired temperature. The effluent gas from the reactor was collected in a heated receiver from which it was exhausted into a sample bomb. Reaction times in the reactor were varied by using tubes of various diameters, by changing feed rate, or by adding an inert diluent such as argon to the reaction mixture. A series of runs was made following this procedure under various conditions of temperature, reactant feed ratios, reaction time, etc. Gas samples were obtained and analyezd by means of a mass spectrometer. To obtain realistic values for the higher boiling products, the sample bomb and the spectrometer inlet system were heated. Analyses were expressed on a mole percentage basis. Yields calculated from the analytical data under the various conditions are recorded in Table I. It should be noted that all yield values were calculated upon the basis that one half of the cyanogen produced came from acetonitrile. If it had been assumed that cyanogen was produced totally from HCN, the calculated yields of malononitrile, for example, would have been higher. Likewise, the method of analysis used for malononitrile tended to give low values because of the non-volatility of this compound. Hence, all yields given are conservative.

Table I

| Run No. | Temp, °C. | Reaction Time (Sec.) | Mole Ratio, HCN:AcN[1] | AcN[1] Conv. percent | Yields Based on AcN (percent) | | | | |
|---|---|---|---|---|---|---|---|---|---|
| | | | | | Malononitrile | Acrylonitrile | Fumaronitrile | Propargyl Nitrile | Cyanogen |
| 1 | 800 | 1.77 | 1.6:1 | 1.8 | 19.1 | 35.3 | 0.0 | 0.0 | 8.8 |
| 2 | 850 | 1.34 | 1.7:1 | 8.8 | 19.0 | 36.8 | 11.0 | 0.0 | 7.7 |
| 3 | 905 | 0.18 | 4.0:1 | 22.1 | 9.6 | 6.5 | 6.1 | 8.0 | 10.5 |
| 4 | 950 | 0.16 | 4.9:1 | 43.7 | 10.5 | 11.2 | 3.5 | 18.8 | 24.5 |
| 5 | 1,000 | 0.11 | 4.6:1 | 53.6 | 2.9 | 11.8 | 2.1 | 21.8 | 23.8 |
| 6 | 1,045 | 0.08 | 6.3:1 | 55.6 | 0.4 | 11.4 | 2.6 | 17.8 | 22.4 |

[1] Acetonitrile.

It will be seen from the foregoing data that the proportion of the various products in the reaction mixture produced by reaction of acetonitrile and HCN can be varied by varying the reaction conditions. Generally speaking, those temperatures at the higher end of the temperature range tend to produce propargyl nitrile and cyanogen in predominating proportions over malononitrile and acrylonitrile while with those at the lower end of the temperature range, malononitrile and acrylonitrile predominate in the reaction product.

Variations in procedure and reaction conditions from those given in the example may be made without departing from the scope of the invention. For example, the reaction may be carried out in a tubular reactor of quartz, porcelain or any other refractory material which is non-catalytic and capable of withstanding the temperatures employed as well as in the silica reactor exemplified. The reactant gases can, if desired, be passed through a series of reaction zones heated to reaction temperature, the mixture being cooled as it issues from each reactor to recover the desired reaction products therefrom. Unreacted feed materials can then be recycled.

While the lowest temperature exemplified is 800° C., the reaction can be effected at temperatures as low as 700° C. Operation at this low temperature, however, is impractical because of the low conversions obtained. The practical upper temperature limit for the reaction is 1100° C. As indicated previously, the preferred temperatures within the broad reaction temperature range of 700° C. to 1100° C. will depend to a great extent upon the distribution desired in the reaction product. The preferred temperatures for the preparation of malononitrile and acrylonitrile, for example, lie in the range from about 700° C. to about 900° C. while the preferred temperatures for producing cyanogen and propargyl nitrile are those from about 900° C. to about 1100° C. The amount of fumaronitrile produced in general decreases as the temperature of the reaction increases but does not vary so sharply as do the other nitrile products.

Reaction time, i.e., the time during which the reaction mixture is maintained in the reaction zone, varies with the particular temperature employed. Generally, a decrease in temperature requires an increase in reaction time and conversely, an increase in temperature will necessitate a shorter reaction time. Reaction times from about 0.01 seconds to about 5 seconds can be satisfactorily employed over the broad temperature range from 700° C. to 1100° C. In the preferred temperature range for producing malononitrile and acrylonitrile, reaction times may vary preferably from about 3 seconds at 700° C. to about 0.2 seconds at 900° C. In the preferred temperature range for producing propargyl nitrile and cyanogen, reaction times may vary from about 1 second at 900° C. to about 0.1 second at 1100° C.

The pressure employed is preferably atmospheric but operation at either subatmospheric or superatmospheric pressure is feasible.

A wide range of reactant ratios can be employed. Mole ratios of HCN to acetonitrile from 1:1 on up to 10:1 can be employed. Preferred, however, for practical operation are those in the range from 3:1 to 5:1.

Inert gaseous diluents can be present in the reaction mixture if desired and gases such as nitrogen, argon and the like may be employed. HCN can be employed in excess as a practical diluent as well as a reactant. The proportions of inert diluent would be limited only by practical considerations.

Recovery of the various nitrile products can be effected by low temperature condensation of the effluent gas mixtures followed by fractional distillation of the liquid condensate in a conventional manner. Unreacted acetonitrile and HCN can be recycled to the reaction zone if desired.

What is claimed is:

1. The process of reacting acetonitrile and hydrogen cyanide at a temperature within the range from about 700° C. to about 1100° C. to produce at least one of the organic nitriles of the group consisting of malononitrile, acrylonitrile, fumaronitrile, propargyl nitrile, and cyanogen.

2. A method for the preparation of malononitrile which comprises reacting acetonitrile with hydrogen cyanide at a temperature in the range from about 700° C. to about 900° C.

3. A method for the preparation of acrylonitrile which comprises reacting acetonitrile with hydrogen cyanide at a temperature in the range from about 700° C. to about 900° C.

4. A method for the preparation of propargyl nitrile which comprises reacting acetonitrile with hydrogen cyanide at a temperature in the range from about 900° C. to about 1100° C.

5. A method for the preparation of cyanogen which comprises reacting acetonitrile with hydrogen cyanide at a temperature in the range from about 700° C. to about 1100° C.

6. A method for the preparation of fumaronitrile which comprises reacting acetonitrile with hydrogen cyanide at a temperature in the range from about 850° C. to about 1100° C.

No references cited.